United States Patent [19]
Naoumenko et al.

[11] Patent Number: 5,270,518
[45] Date of Patent: Dec. 14, 1993

[54] LAMINATED GLAZING PANE

[75] Inventors: Yves Naoumenko, Les Bordes; Pierre Chaussade, Sully sur Loire, both of France

[73] Assignee: Saint-Gobain Vitrage International, Aubervilliers Cedex, France

[21] Appl. No.: 848,375

[22] Filed: Mar. 9, 1992

[30] Foreign Application Priority Data

Mar. 8, 1991 [FR] France ............................ 91 02794

[51] Int. Cl.$^5$ .................. H05B 3/16; B64C 1/10; B64D 7/00; B32B 23/02
[52] U.S. Cl. .................................. 219/203; 219/543; 219/547; 244/121; 428/192
[58] Field of Search ............... 219/203, 547, 522, 543; 244/121, 134; 428/38, 192, 339, 424.2, 425.6, 430

[56] References Cited

U.S. PATENT DOCUMENTS

| | | | |
|---|---|---|---|
| 3,081,205 | 3/1963 | Shorr | 161/190 |
| 3,538,055 | 11/1970 | Camilleri | 260/75 |
| 3,616,122 | 10/1971 | Orcutt | 161/45 |
| 4,073,986 | 2/1978 | Keslar et al. | 428/38 |
| 4,130,684 | 12/1978 | Littell, Jr. et al. | 428/212 |
| 4,284,677 | 8/1981 | Herliczek | 428/192 |
| 5,132,162 | 7/1992 | De Paoli | 428/192 |

FOREIGN PATENT DOCUMENTS 1390519 1/1965 France .

*Primary Examiner*—Bruce A. Reynolds
*Assistant Examiner*—Michael O. Switzer
*Attorney, Agent, or Firm*—Oblon, Spivak, McClelland, Maier & Neustadt

[57] ABSTRACT

This invention relates to a laminated glazing pane which may be used as an aircraft windshield. The pane comprises at least two glass sheets connected together by an intermediate layer of polyvinyl butyral and, in its marginal zone, between at least one glass sheet and the intermediate layer, at least one adhesive ring comprising a plastic material which absorbs at least a portion of the stresses to which the pane is subjected during operation.

21 Claims, 1 Drawing Sheet

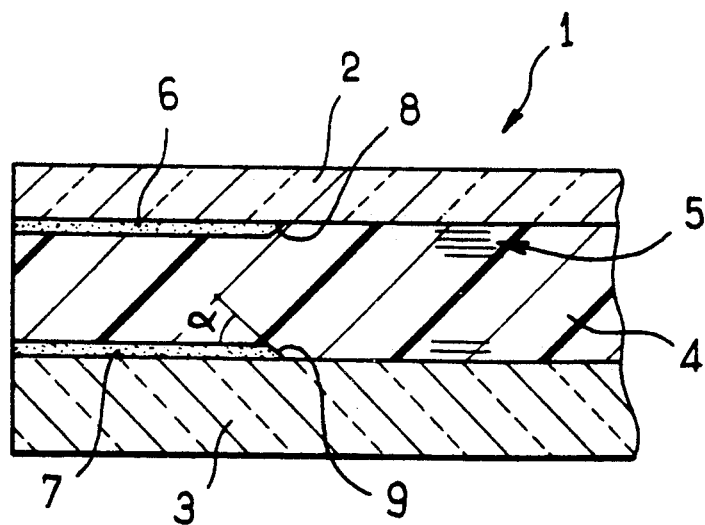
FIG_1
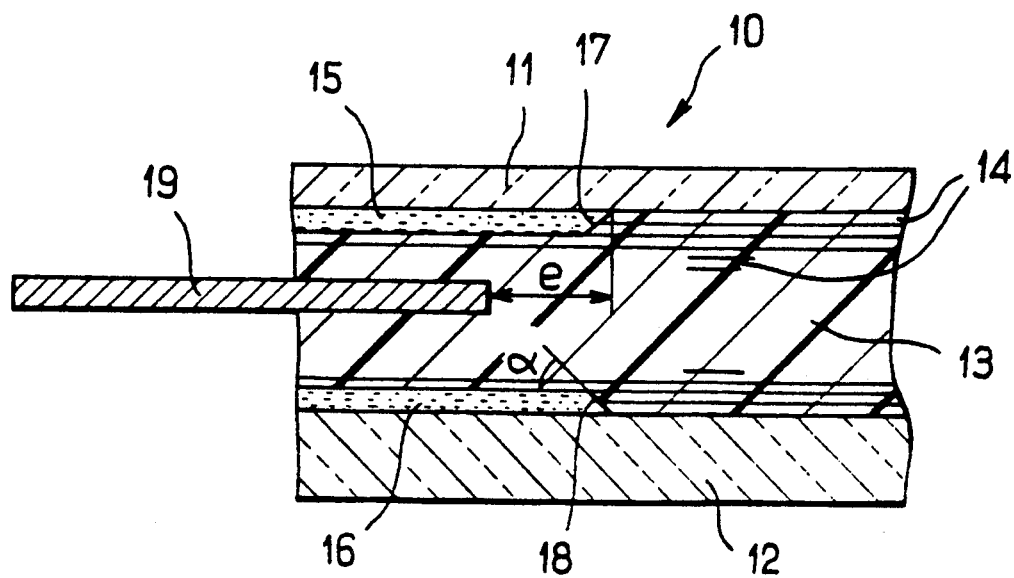
FIG_2

LAMINATED GLAZING PANE

BACKGROUND OF THE INVENTION

1. Field of the Invention

This invention relates to a laminated glazing pane for transportation vehicles. Particularly, the laminated glazing pane may be used as an aircraft windshield.

2. Discussion of the Background

Laminated glazing panes for use as an aircraft windshield are generally comprised of two thermally or chemically toughened glass sheets and a thermoplastic intermediate film composed of several plies of plasticized polyvinyl butyral (hereinafter referred to as PVB). Plasticized PVB is selected for this application because of its high modulus in tension and high elongation at rupture, and because it can absorb energy while assuring leak-tightness of a pane in which all the glass sheets are broken.

When a laminated glazing pane of this type is used in an aircraft at high altitude, it is subjected to considerable pressure and temperature differences on its two faces. Because the coefficient of expansion of PVB is larger than the coefficient of expansion of the glass sheets, the pane is subjected to stresses, such as shear stresses, at the edges of the pane. These stresses are further increased when the pane is subjected to shocks or impacts from, for example, a bird striking the windshield. Furthermore, the modulus of tension of PVB is increased at low temperatures such as below 0° C.

These stress problems are further accentuated when the intermediate film comprises, embedded in its edges, a peripheral band of a metal or a laminated material, which increases the rigidity of the pane and/or makes mounting by bolting, for instance, of the pane into the body work of the aircraft cockpit easier.

Proposed solutions to the above described stress problems are directed at reducing the stresses referred to above, thereby reducing the risk of failure of the pane by reducing the stresses in the pane. One of the proposed solutions consists of applying a material acting as a separator into the marginal portion of the pane. This solution may be suitable for panes of small dimensions. However, it is unsatisfactory for panes the size of an aircraft windshield. Furthermore, the separator materials may promote the penetration of humidity into the intervening PVB, leading to loss of bond at undesirable locations, as well as to loss of optical quality of the pane such as transparency. In addition, separator materials not having the optical quality of the intermediate films used in laminated panes reduce the field of view of the pane.

French Patent Publication FR-A-2 310 979 suggests placing continuous polyurethane film between the PVB film and the glass sheet. The polyurethane film deflects the shear forces and thus reduces the effect of the thermal contraction of the PVB. However, this proposed solution generally requires an activation of the bond for the polyurethane over the entire contact surface with the glass. As a result, a supplementary interface between two different thermoplastic products having different indices of refraction is created which can introduce optical defects into the pane.

SUMMARY OF THE INVENTION

Accordingly, one object of this invention is to provide a novel laminated glazing pane structure, which possesses the desired mechanical and optical properties in extreme conditions of temperature and pressure over time.

The laminated glazing pane according to this invention comprises at least two sheets of glass, separated by an intermediate film of a PVB type plastic material, and at least one ring comprising a plastic material having a shear modulus smaller than the shear modulus of the intermediate film, elongation properties better than the elongation properties of the intermediate film and properties of adhesion to the intermediate film and to the glass, interposed between at least one glass sheet and the intermediate film in the marginal part of the pane.

BRIEF SUMMARY OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a sectional view of a glazing pane according to this invention.

FIG. 2 is a sectional view of a variant of a glazing pane according to this invention, equipped with a peripheral band.

DETAILED DESCRIPTION OF THE PREFERRED EMBODIMENTS

The glass sheets may be formed of thermally or chemically toughened glass. At least one ring of a plastic material is interposed between a glass sheet and an intermediate film in the marginal part of the glazing pane. In the case where two glass sheets are used in forming the glazing pane, the ring may be in contact with the outside glass sheet of the glazing pane or the inside glass sheet of the glazing pane. Alternatively, two rings may be employed such that one ring is in contact with the outside glass sheet and another ring is in contact with the inside glass sheet. In a preferred embodiment, the pane according to this invention comprises rings of plastics material interposed between each of the PVB and glass sheet interfaces. Where the glazing pane comprises more than two glass sheets, a ring can be provided as described above at each interface between glass and PVB.

PVB type plastic materials are plastic materials having properties and characteristics similar to those of PVB and behave similar to PVB in an aircraft glazing pane. The PVB type plastic materials may be, for example, thermoplastic materials such as PVB, plasticized PVB, polyvinyl chloride, etc. In the remainder of this description the term PVB type plastic material will be used in the interests of simplicity and is intended to encompass the above described materials.

The plastic material forming the ring may be a thermosetting elastomer such as thermosetting silicones and thermosetting polyurethanes, or a thermoplastic elastomer such as thermoplastic polyurethanes. The plastic material capable of being used according to this invention may possess an elongation at rupture of from 200 to 700% and preferably from 300 to 600%, and a shear modulus from 1 to 100 MPa and preferably from 10 to 80 MPa, measured at temperatures between approximately −30° C. and +40° C.

The ring formed of a plastic material must have dimensions that will allow it to absorb and progressively transmit the shear stresses to which the intermediate film of PVB type plastic material is subjected. The thickness of the ring may range between 0.2 mn and 2 mm, depending upon the thickness of the intermediate film. Preferably, the thickness of the ring is from 5 to 15% of the thickness of the PVB type plastic material separating the glass sheets. The width of the ring may range between 15 to 100 mm, depending upon the dimensions of the pane. Preferably, the width is from 2 to 15% of the length or width of the pane. The width of the ring may vary along the periphery of a single pane according to the shape and dimensions of the pane.

In order to avoid localized stresses at the inner edge of the ring, the thickness of the edge of the ring may be decreased progressively towards the face of the glass. When the ring is composed of several plies, the edge of the ring may be stepped such that the height of each step corresponds to the thickness of each ply, which is preferably less than 0.5 mm. When the ring is composed of a single ply, the edge may have a chamfered shape. The angle of slope of the line of decrease of the edge is preferably less than 45°.

The ring must possess adhesive properties to both the glass and the PVB type plastic material. If the plastic material from which the ring is formed does not possess adequate adhesive properties, it is necessary to improve these properties by the use of a primer or any other suitable treatment. Thus, the surface of the glass in contact with the ring may be treated with a bond promoter such as an amino-silane. Preferably, the adhesiveness of the ring to the glass is of the same order of magnitude as adhesiveness of the PVB type plastic material to the glass.

The pane may contain a peripheral band or insert of metal or other material based upon synthetic fibers, partially embedded in the PVB type plastic material, and perforated to allow the glazing to be mounted on the cockpit by bolting. When such a peripheral band or insert is used, the ring or rings used according to this invention should have a width such that the ring or rings extend internally beyond the depth of penetration of the band into the intermediate film for a distance, preferably, of at least 5 mm. This construction enables the various supplementary stresses created by the band, such as lever effect, thermal bridge, etc., to be absorbed.

The intermediate film may be composed of several plies. These several plies may be based upon a single PVB type plastic material such as plasticized PVB containing identical proportions of plasticizer. Alternatively, these several plies of, for example, plasticized PVB, may contain different proportions of plasticizer.

The glazing pane according to this invention may also be a heated pane wherein at least one face of one glass sheet may be provided with a heating means such as a heating electrical resistor or be in contact with such a resistor. Examples of a heating electrical resistor include a continuous conducting film deposited on the face of the glass and a network of fine metallic electrical resistance threads inset into the intermediate film in contact with the glass sheet.

Referring now to the drawings, wherein like reference numerals designate identical or corresponding parts throughout the several views, and more particularly to FIG. 1 thereof, showing a pane 1 according to this invention, composed of two thermally toughened glass sheets, an outer glass sheet 2 and an inner glass sheet 3, between which is interposed an intermediate film 4 having the same dimensions as the two glass sheets, composed of several plies 5 of PVB. At the periphery of the pane, in the glass-PVB interfaces, are provided two rings 6, 7 of polyurethane. The polyurethane is a thermosetting elastomer produced by injection or molding. This polyurethane has an elongation at rupture of 350% and a shear modulus of 60 MPa measured at a temperature of $-30°$ C., and adheres to both the glass and the PVB. The adhesion values measured by the pealing test described below is 15 daN/cm for the adhesion between polyurethane and glass.

The adhesion values were measured from test specimens of glass of $8 \times 8$ cm, faced with a film produced from the polyurethane forming the ring. A tongue of 1 cm width is cut out from the covering film and is unstuck over a length of 3 cm. The test consists of pulling on the tongue, perpendicularly to the surface of the glass, at a pulling speed of 2 cm/min. The force necessary for peeling off is measured.

Rings 6, 7 have a thickness of 1 mm, whereas the thickness of the PVB outside the annular zone is 10 mm. The width of a ring is 20 mm and the pane has dimensions in length and width of the order of 500 mm. The inner edges 8, 9 of the rings have a chamfered shape. The angle $\alpha$ is approximately 20°. This progressive reduction in the thickness of the ring created by the chamfered shape avoids the risk of optical distortion and results in a better glass-polyurethane-PVB connection.

FIG. 2 shows, in section, a windshield 10 for use in an aircraft composed of two sheets of thermally toughened glass comprising an outer glass sheet 11 and inner glass sheet 12, connected together by an intermediate plasticized PVB film 13 having the same dimensions as the two glass sheets. The intermediate plasticized PVB film 13 is composed of 20 internal plies 14 of 0.5 mm thickness each containing 19 parts by weight plasticizer. Two rings 15, 16 of thermoplastic polyurethane are disposed at the periphery of the pane between the intermediate film 13 and the glass sheets 11, 12. The two rings 15, 16 are produced by molding. The thermoplastic polyurethane is a polyester urethane. The inner edges 17, 18 of the rings are chamfered wherein the angle $\alpha$ is approximately 20°. A peripheral band 19 is partly embedded in the intermediate film. Preferably, the peripheral band 19 is 2 mm thick and embedded to a depth of approximately 30 mm in the intermediate film and may be composed of stainless steal, aluminum, or a fibrous structure, and it is intended to be perforated for mounting the glazing pane by bolting on the aircraft structure. The rings extend towards the interior of the pane beyond the edge of the metal band by a distance e, preferably greater than 5 mm. The thickness of each ring is approximately 1 mm which corresponds to the thickness of two plies of plasticized PVB.

The construction of the above described glazing pane enables the movements of the peripheral band and the different stresses acting on the pane at high altitude to be absorbed.

Obviously, numerous modifications and variations of the present invention are possible in light of the above teachings. It is therefore to be understood that within the scope of the appended claims, the invention may be practiced otherwise than as specifically described herein.

What is claimed is:

1. A laminated glazing pane for use as an aircraft windshield, comprising at least two glass sheets separated by an intermediate film of a polyvinyl butyral type plastic material, and at least one ring comprising a plastic material having:

a shear modulus of from 1 to 100 MPa at between −30° C. and +40° C. which shear modulus is smaller than the shear modulus of the intermediate film;

greater elongation properties than the elongation properties of the intermediate film; and properties of adhesion to the intermediate film and to the glass, said ring interposed between at least one glass sheet and the intermediate film in the marginal part of the pane.

2. The laminated glazing pane according to claim 1, wherein a ring of plastic material is situated in each of the glass intermediate film interfaces.

3. The laminated glazing pane according to claim 1, wherein the thickness of the ring is 5 to 15% of the thickness of the intermediate film.

4. The laminated glazing pane according to claim 1, wherein the width of the ring is 2 to 15% of the dimensions of the pane.

5. The laminated glazing pane according to claim 1, wherein the thickness of the inner edge of the ring decreases progressively towards the face of the glass.

6. The laminated glazing pane according to claim 5, wherein the angle between the glass and the tangent to the decrease in the thickness of the ring is less than 45°.

7. The laminated glazing pane according to claim 1, wherein the ring is produced by molding.

8. The laminated glazing pane according to claim 1, wherein the plastic material forming the ring is a thermosetting elastomer or a thermoplastic elastomer.

9. The laminated glazing pane according to claim 8, wherein the plastic material forming the ring is a thermoplastic polyurethane.

10. The laminated glazing pane according to claim 8, wherein the plastic material forming the ring is a thermosetting elastomer selected from the group consisting of silicones and polyurethanes.

11. The laminated glazing pane according to claim 1, characterized in that the ring has an elongation at rupture from 200 to 700%.

12. The laminated glazing pane according to claim 11, characterized in that the ring has an elongation at rupture from 300 to 600% and a shear modulus from 10 to 80 MPa, measured at between −30° C. and +40° C.

13. The laminated glazing pane according to claim 1, characterized in that the adhesiveness of the ring to the intermediate film and to the glass is of the same order of magnitude as the adhesiveness of the intermediate film to the glass.

14. The laminated glazing pane according to claim 1, further comprising a band partly embedded in the intermediate polyvinyl butyral type plastic material.

15. The laminated glazing pane according to claim 14, wherein the ring extends over a width greater than the width of the embedded part of the band.

16. The laminated glazing pane according to claim 15, wherein the ring extends beyond the edge of the band by a distance greater than 5 mm.

17. The laminated glazing pane according to claim 1, further comprising a heating electrical resistor.

18. The laminated glazing pane according to claim 1, wherein the polyvinyl butyral type plastic material is selected from the group consisting of polyvinyl butyral, plasticized polyvinyl butyral, and polyvinyl chloride.

19. The laminated glazing pane according to claim 1, wherein said intermediate film is coextensive with said at least two glass sheets.

20. The laminated glazing pane according to claim 1, wherein said ring consists of a material selected from the group consisting of thermosetting silicones, thermosetting polyurethanes and thermoplastic polyurethanes.

21. The laminated glazing pane according to claim 1, wherein said ring consists of a plastic material having:

a shear modulus of from 10 to 80 MPa measured at between −30° C. and +40° C. which shear modulus is smaller than the shear modulus of the intermediate film, greater elongation properties than the elongation properties of the intermediate film, and properties of adhesion to the intermediate film and to the glass.

* * * * *